United States Patent [19]

Okabayashi et al.

[11] Patent Number: 4,518,704
[45] Date of Patent: May 21, 1985

[54] ACTIVATED CARBON FORMED BODY AND METHOD OF PRODUCING THE SAME

[75] Inventors: Yoshikatsu Okabayashi; Noboru Nakamura; Takeshi Matsumoto; Yoshimasa Osumi, all of Kokubu, Japan

[73] Assignee: Kyoto Ceramic Kabushiki Kaisha, Japan

[21] Appl. No.: 545,074

[22] Filed: Oct. 24, 1983

Related U.S. Application Data

[63] Continuation of Ser. No. 326,577, Dec. 12, 1981, abandoned.

[30] Foreign Application Priority Data

Dec. 8, 1980 [JP] Japan .............................. 55-173500
Dec. 8, 1980 [JP] Japan .............................. 55-173501

[51] Int. Cl.³ .................. B01J 20/20; B01J 20/28; B01J 21/18; B32B 3/12
[52] U.S. Cl. ...................................... 502/80; 55/74; 156/89; 264/122; 428/116; 502/180; 502/413; 502/527
[58] Field of Search ............... 502/80, 180, 413, 527; 428/116; 156/89; 264/122, 117, 29.1

[56] References Cited

U.S. PATENT DOCUMENTS

| 2,439,538 | 4/1948 | Burgess | 252/446 |
| 3,960,771 | 6/1976 | Tanaka et al. | 252/446 |
| 4,058,483 | 11/1977 | Henbest | 252/446 |
| 4,259,299 | 3/1981 | Hagiwara et al. | 252/446 |

FOREIGN PATENT DOCUMENTS

| 1567491 | 4/1969 | Fed. Rep. of Germany | 252/446 |
| 2409 | 9/1865 | United Kingdom | 252/446 |
| 3078 | 11/1865 | United Kingdom | 252/446 |

Primary Examiner—P. E. Konopka
Attorney, Agent, or Firm—Spensley Horn Jubas & Lubitz

[57] ABSTRACT

This disclosure relates to a formed body having activated carbon granules bondedly carried by an inorganic substance body consisting of a sintered body or fused body of inorganic substance powder. The formed body preferably is of a honeycombed structure. The formed body is not only high in strength, excellent in absorbing ability, long in service life, but also permits of molding into various shapes fit for uses. The invention also relates to a method of producing the formed body of the type described above. The method essentially follows the conventional ceramic firing art or ceramic production art.

8 Claims, 8 Drawing Figures

ACTIVATED CARBON FORMED BODY AND METHOD OF PRODUCING THE SAME

This application is a continuation of application Ser. No. 326,577, filed Dec. 12, 1981, now abandoned.

BACKGROUND OF THE INVENTION

1. Field of the Invention

This invention relates to a novel activated carbon formed body and more particularly to an activated carbon formed body consisting of activated carbon granules and inorganic substance carrier. The invention relates also to a method of producing the activated carbon formed body.

2. Prior Art

As is well known, activated carbon is widely used as an adsorbing body for deodorization or decolourization, as a catalyst for decomposition of ozone and as a carrier for various catalysts. However, the activated carbon is usually provided in the form of granules or pellets but is, in few cases, available in the form of a specifically shaped body.

Granule or pellet type activated carbon cannot be incorporated in its available form into a device as an adsorbing body or a catalyst carrier, and requires a special casing in which, the carbon must be maintained horizontally. Accordingly, the direction of ventilation is limited to a vertical direction and incorporation of the carbon into such a device involves difficulties. Further the method of using the carbon in such a situation is severely limited.

An example of an activated carbon formed body of a specified shape is one in which a mixture of activated carbon powder, such as charcoal and coal, with a bonding agent, such as tar and pitch, is pressure molded, dried at a temperature of about 100° C., carbonized at a temperature of lower than 600° C. and then steamed and activated in an activation furnace. But the fact that the method above uses hard-to-handle pitch and tar, which themselves are changed by activation treatment into activated carbon as a bonding agent, makes it difficult to use various molding methods other than pressure molding. Accordingly if the formed body has a complicated shape as to make passage of steam difficult therethrough, it is difficult to activate the formed body sufficiently far into the interior because activation treatment is effected after completion of the body. This is a fatal defect involved in such a conventional formed body. Presently, there is no alternative but to provide the activated carbon formed body of this type in the form of a plate or a very simple and small shape equivalent to the plate. Thus, it is difficult to obtain formed bodies of various shapes adapted for application of use, particularly, a large-sized body.

An activated carbon formed body of the type different from the above is one in which activated carbon granules are bonded by an organic binder. However, the formed body of this type, because the surface of the carbon granules are bonded by an organic binder, does not have full activating property. Moreover, because the binder deteriorates due to heat and with the lapse of time, the formed body is reduced in strength and lacks practical applicability. This is yet another disadvantage inherent in the formed body of this type.

Yet another actuated carbon body is one in which the surface of a ceramic base is coated with activated carbon granules of a rubber-based or other organic binder. This formed body, in comparison with the preceding body bonded by the organic binder, has high activating properties and little tendency to deteriorate. However, it has a disadvantage in that because the surface of the base is coated with activated carbon granules, the amount of activated carbon granules held is small, with the result that the formed body loses its activating property in a relatively short time of use. An activated carbon formed body equivalent to the type described above has been developed and is used, for example, as activated carbon fiber paper in a corrugated cardboard for use as a filter. Because the material used is paper, however, the formed body changes in shape by the effect of moisture, and is not thus equal to the above-described types in strength. In addition, because the formed body does not have a high content of activated carbon fiber, the body, has a short service life.

SUMMARY OF THE INVENTION

This invention has for its object providing an activated carbon formed body which can obviate the disadvantages of the kind described above, namely, a useful activated carbon formed body excellent in adsorbing activation, long in lifetime, small in strength deterioration, easy to manufacture, and which can be molded in various sizes and shapes according to application of uses. Further, the body of the present invention can easily be assembled into various devices in the form of an adsorbing body and a catalytic carrier, and is limitless in the direction of ventilation. This invention also relates to a method of producing the activated carbon formed body.

BRIEF EXPLANATION OF THE DRAWINGS

A detailed description will now be given of the invention with reference to the accompanying drawings illustrating preferred embodiments of the invention wherein.

DETAILED DESCRIPTION OF THE INVENTION

Figures 1, 1A:
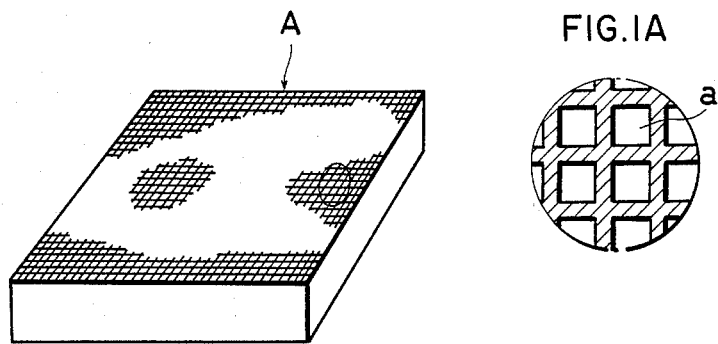
FIG. 1 is a perspective view, partly in enlargement, of the activated carbon formed body of the invention shown in one form of embodiment.

The activated carbon formed body of the invention consists of activated carbon granules 2 and an inorganic substance carrier 1 bondedly carrying the activated carbon granules 2 by firing or fusing and is a porous body having numerous pores 3 between each granule 2. The carrier 1. The body preferably is formed in a honeycombed body A having numerous square cells a as illustrated in FIG. 1. Various other forms such as a plate, cylinder, pyramid are also within the scope of this invention.

A description will now be given of a method of producing such a formed body.

Figure 2:
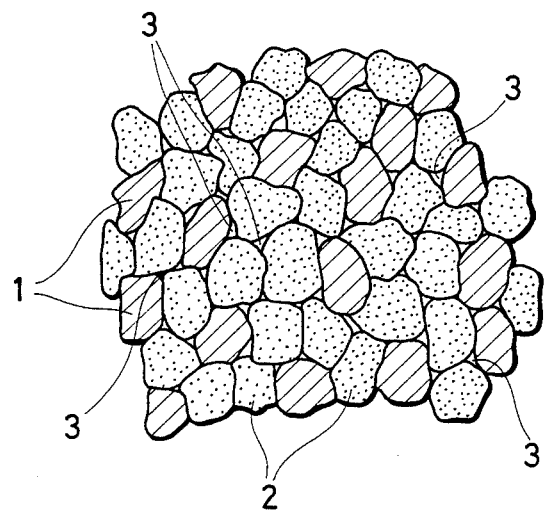
FIG. 2 illustrates the inner structure of the activated carbon formed body of the invention.

To obtain the formed body of the invention, a kneaded composition containing inorganic substance powder capable of being fired or fused and activated carbon granules is used as the starting material. This composition is molded into a desired shape and is fired in an nonoxidative atmosphere, whereby a porous activated carbon formed body bondedly carried by an inorganic substance carrier 1 and having numerous pores 3 between the granules 2 or between the granules 2 and the inorganic substance carrier 1 is obtained. The inorganic substance carrier 1 consisting of a fired or fused body bonded irregularly in three dimensional directions with the inorganic substance powder (carrier) disposed between the granules 2 as shown in FIG. 2.

The kneading range of the materials is selected in such manner that the activated carbon granules contained in the formed body is in the range of 95–10% by weight, and the inorganic substance carrier is in the range of 5–90% by weight. When a clay material, such as ball clay, kaolin is used as a raw material, the material is reduced in water content by about ten percent by weight. This is done by firing and in consequence the compounding amount of the powder must be increased in anticipation of such possible loss in the amount of the binder. However, in the case of an oxide for a ceramic, such as alumina, the loss in percent weight which results from firing is negligible. This loss can be as small as 1/1000%. As a result, an inorganic substance of this kind may be substantially in the range of 5–90% by weight. Similarly, since the activated carbon granules are also prevented from oxidation during firing, there is scarcely any possibility of the granules being reduced in amount due to firing, and accordingly, the compounding amount of the granules may be in the range of 95–10% by weight.

If the inorganic substance carrier in the formed body is less than 5% by weight and the activated carbon granules exceed 95% by weight, the inorganic substance carrier 1 in the activated carbon formed body obtained produces an irregular three dimensional structure full of gaps because of shortage of compounding amount of inorganic substance powder. Accordingly, it becomes difficult for the substance carrier 1 to sufficiently bond and carry activated carbon granules. Because of this there is the possibility that the formed body may be reduced in mechanial strength and disintegrated by a small external force. Conversely, if the inorganic substance carrier 1 exceeds 90% by weight and the activated carbon graunles are less than 10%, the formed body produces a cell structucte due to an excess of inorganic substance powder. Accordingly, the activated carbon granules are reduced in contact with air and liquid so that it becomes difficult for the formed body to display the activating, namely, adsorbing property. Further the amount of activated carbon granules 2 held in the formed body is reduced to shorten, in turn, the service life of the body considerably. If comparison is made between the strength, activation and service life of the activated carbon formed body obtained, it is more desirable to place the inorganic substance carrier in the range of 20–70% by weight and the activated carbon granules in the range of 80–30% by weight in these ranges it is possible to obtain an activated carbon formed body having satisfactory strength, activation, and service life.

The inorganic substance powder which may be used in single or in combination include as for example, clay, talc, alumina powder, magnesia powder, silica powder, kaolin powder, and other sinterable inorganic substance powder, as well as fusible inorganic substance powder such as glass powder. However, when the price, availability, pore forming property of the formed body obtained from the materials described or certain hardness features are desired clay, particularly kibushi clay (clay produced in the Seto district of Japan) is most suitably used. Replacement of a part or the whole of the clay material with calcined clay or calcined talc reduces firing shrinkage, thereby favorably forming a porous body high in porosity.

The activated carbon granules which may be used include various kinds of activated carbon granules which are commercially available. The granules prepared by a steam activation process and having a surface area of relatively high purity of more than 800 $m^2/g$ are preferred as they are superior in activation.

The inorganic substance powder and activated carbon granules preferably have a large grain size in the order of 80–300 mesh. Such size is preferable from the viewpoint of kneadability, handling, molding property, pore formability, etc.

Incidentally, if necessary, a suitable amount of inorganic binder, water, etc. as a modifier may be mixed into a kneaded composition of the materials used in the invention in order to impart good formability to the material. The organic binder which may be used includes polyvinyl alcohol, methyl cellulose, and other known binders relatively low in decomposition temperature such that they are thermally decomposed and volatilizable in the final firing step.

When the kneaded composition having a thermally decomposable binder or water mixed therewith is used, the activated formed body obtained becomes more porous because the water or organic binder is evaporated or thermally decomposed and volatilized to form pores in drying subsequent to the molding step or in the firing step.

According to the production method of the invention, the kneaded composition of the material described above is molded into a desired shape, fit for application of use and then is fired. Note that pressure molding, injection molding and various other known means can be used as the molding means. Since the kneaded composition contains inflammable activated carbon granules, firing must be carried out in a nonoxidative atmosphere such as $H_2$ gas, $H_2$ and $N_2$ mixed gas, $CO_2$ gas, $CO_2$ and $H_2$ mixed gas. Further the firing temperature of the composition is preferably in the range of 300°–1200° C. suitable for calcination (but when the composition contains an organic binder, the temperature should be higher than the decomposition temperature of the binder), preferably in the neighborhood of 1100° C. The firing time is in the range of 1–4 hours and particularly preferably in the neighborhood of two hours. If the firing temperature exceeds 1100° C., the activated carbon granules are reduced in adsorbing property, and the firable inorganic substance powder in the composition approaches complete sintering. Further the volume and porosity of the granules are reduced or fusible inorganic substance powder is unfavorably melted free. Conversely, if the temperature is lower than 300° C., insufficient firing makes it difficult to obtain a formed body of high strength, and when the composition contains an inorganic binder, a formed body inferior in activation is produced because sufficient decomposition and volatilization of the binder is not carried out.

According to the production method of the invention, normally as described above, the kneaded composition is molded and is then fired in an nonxidative atmosphere furnace. When for example an intended activated carbon formed body is of a simple shape, such as a plate which permits pressure molding, molding and firing may simultaneously carried out in a single heating press mold.

The activated carbon formed body obtained by the production method above forms the inorganic substance carrier 1 in which inorganic substance powder is fired or fused to each other and are bonded irregularly to each other in three dimensional directions to form an inorganic substance carrier 1 between the activated carbon granules 2 as shown in FIG. 2 in this manner innumerable activated carbon granules 2 are bondedly carried by the carrier. Further, since carrier 1 consisting of a fired body or fused body of inorganic substance powder or a mixture of the fired and fused bodies that bondedly carries the activated carbon granules 2, the activated carbon formed body is high in strength and free from deterioration due to heat and with the lapse of time. Furthermore, since the activated carbon granules 2 in maximum quantities of 90% by weight are bondedly carried and numerous pores 3 formed in the formed body itself to provide excellent contact between fluid or gas and the activated carbon granules, the formed body is greatly increased in its adsorptive activation and service life. Moreover, since the formed body can dispense with the final activation treatment required for the conventional bonding agent, such as pitch and tar, which are hard to handle, it is free from any restriction as to molding and can be formed into a desired shape.

FIG. 1 shows one embodiment of the activated carbon formed body of the invention. The body is produced in a honeycombed body A having numerous square cells a, particularly having 300-600 cells per square inch and having a space factor (porosity) of 60-70% by extruding a kneaded composition from a die, cutting the extruded composition in a specified thickness, drying and firing the same in a nonoxidative atmosphere. The formed body produced is excellent in contact with air, small in ventilation resistance, and high in mechanical strength, and accordingly very fit for uses as for an air filter. It should be understood that the body of the invention can be formed in other specified shapes depending upon its uses.

A detailed description will now be given of the invention with reference to embodiments thereof.

EXAMPLE 1

Five kinds of material compositions (A), (B), (C), (D) and (E) were prepared by kneading 100-mesh pass activated palm charcoal granules commercially obtainable under the trade name of "Palm TL-300" produced by Hokuetsu Carbon Industrial Co.Ltd., Kibushi clay, and thermally decomposable binder (a mixture of PVA and methyl cellulose) in the manner that the final composition of the formed body obtained might form the precentage shown in Table 1. Each composition prepared was subjected to pressure molding by a hydraulic press (50 t) and dried to obtain a plate of 5 mm×10 mm×30 mm. Thereafter, each platelike formed body was fired in a $H_2$ and $N_2$ nonoxidative atmosphere furnace at 1100° C. for two hours to obtain five kinds of activated plate formed bodies. Measurement was made of three-point bending strength test (span 20 mm) and water absorption rate by water soaking. The results obtained are shown in FIGS. 3 and 4.

Figure 3:
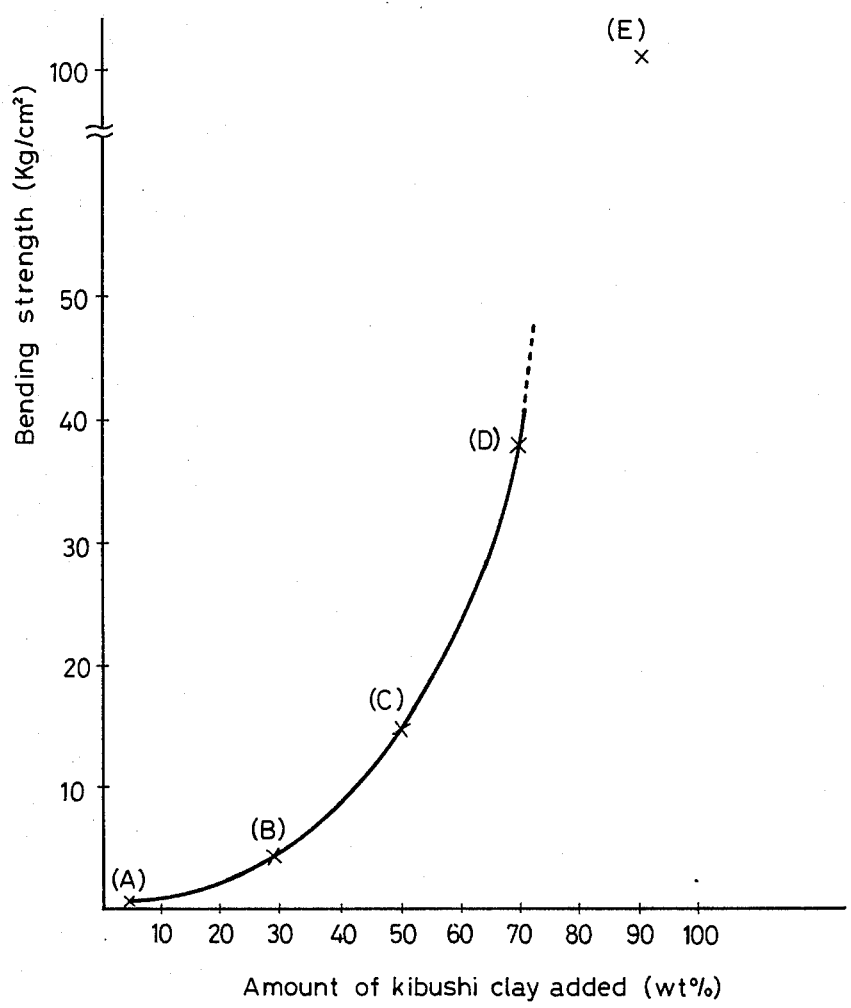
FIG. 3 is a graphic representation showing the bending strength of the activated carbon formed body of the invention.
Figure 4:
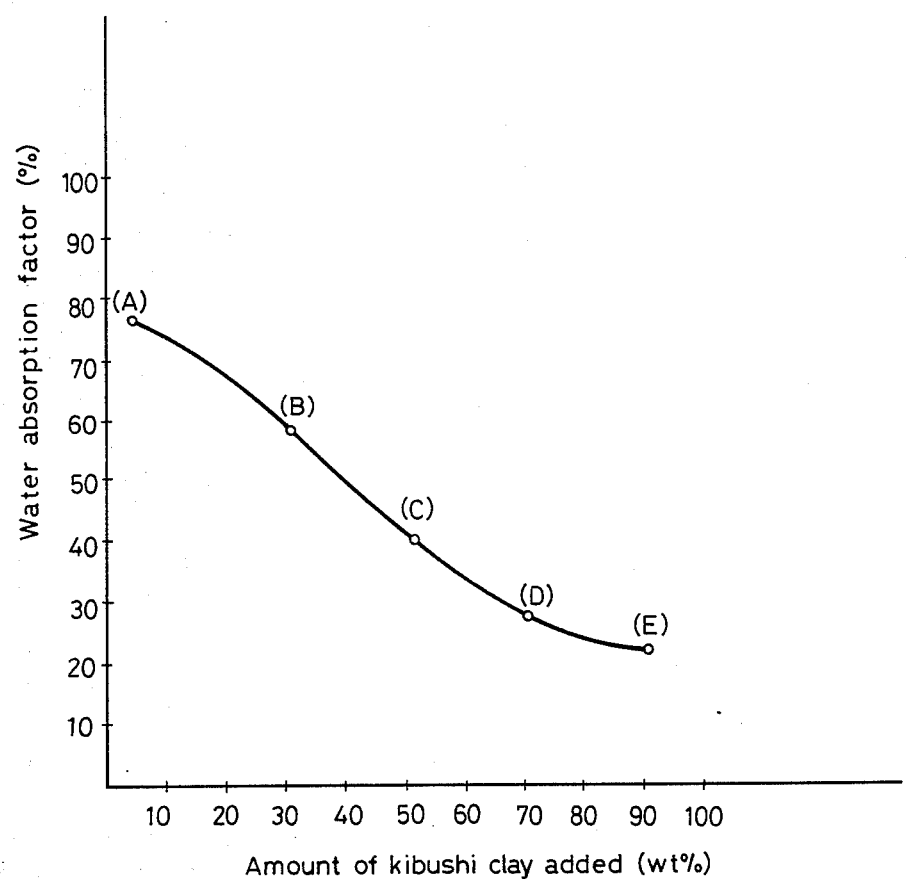
FIG. 4 is a graphic representation showing the absorption rate of the formed body of the invention.

FIG. 3 shows that the bending strength of the formed body is progressively increased in proportion to an increase in the percentage of kibushi clay was inorganic material bondedly carrying the activated carbon granules 2. However, when the kibushi clay is 5% by weight in content, there is the possibility of the bending strength being reduced to 1 kg/cm² and showing a slight shortage. Accordingly, it is apparent that when mechanical strength is required, it is desirable to contain more than about 20 wt. % of kibushi clay in order to provide a bending strength of more than several kgs. per cm². FIG. 4 shows that the water absorption rate of the formed body is decreased in proportion to an increase in kibushi clay even if the body contains 90 wt.% of kibushi clay, the body shows more than 20% of water absorption rate. This shows how rich in porosity the body is.

TABLE 1

| Constituents | Composition range of formed body | | | | |
| --- | --- | --- | --- | --- | --- |
|  | A | B | C | D | E |
| Activated carbon granules (wt. %) | 95 | 70 | 50 | 30 | 10 |
| Kibushi clay (wt. %) | 5 | 30 | 50 | 70 | 90 |
| Inorganic binder | suitable quantity | " | " | " | " |

EXAMPLE 2

Material compositions (B), (C), (D) and (E) prepared in Example 1 (but a suitable amount of water added thereto) each was extruded from an extrusion die. After drying, the compositions were fired under the same conditions as those in Example 1, to obtain activated carbon honeycombed bodies of four types having 450 square cells per square inch and having a size of 25 mm in diameter×20 mm in length.

Out of the bodies thus obtained, three types (B), (C) and (D) were subjected to an adsorption test on the following conditions.

Conditions

Each two of the bodies (B), (C) and (D) were respectively laid one over the other, and an air-benzene mixed gas having more than 5000 ppm in benzene content was passed through the thus treated bodies at a flow rate of 1.26 l/min. to measure the weight of adsorption increased by the lapse of time. The results obtained are shown in FIG. 5.

Figure 6:
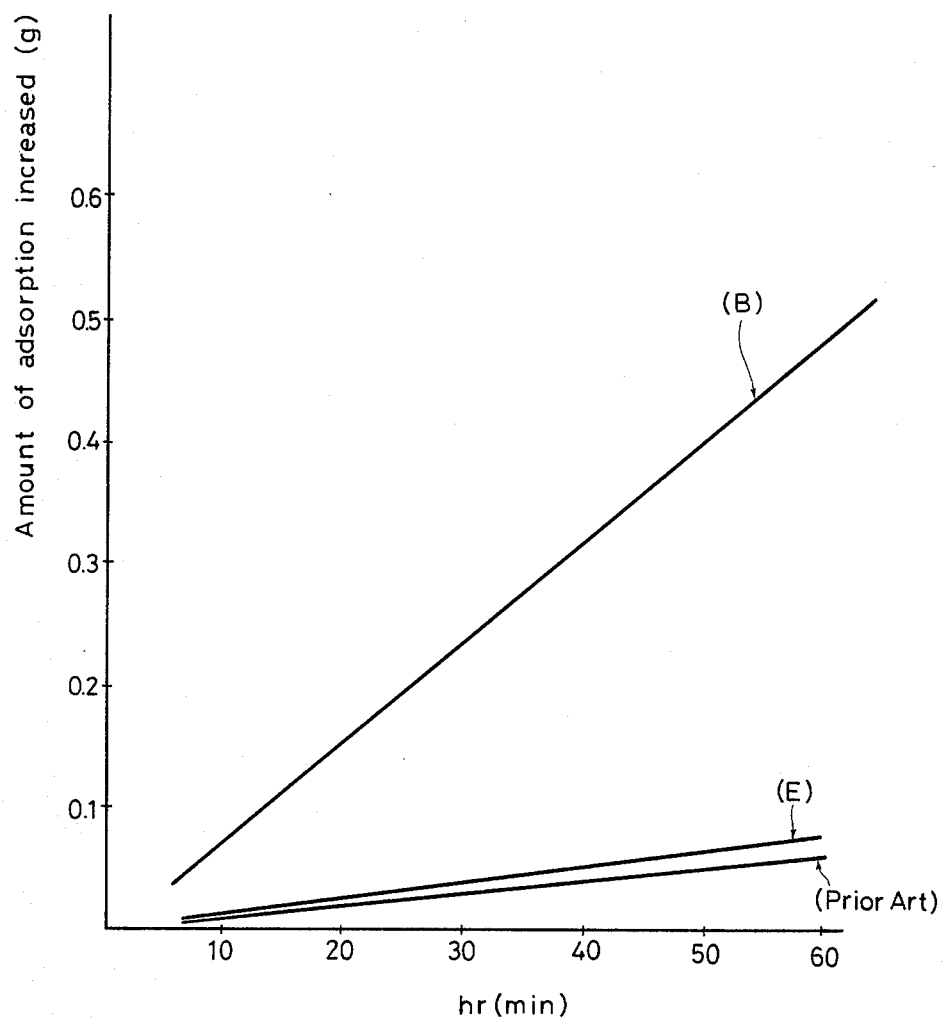
FIGS. 6 and 7 are, respectively, graphic representations showing, by comparison, the adsorbing ability of the formed body of the invention and that of conventional formed body.

In addition, an adsorption test with respect to the bodies (B) and (E) was conducted in the same manner by changing a flow rate of air-benzene mixed gas to 2 l/min. The results obtained are shown in FIG. 6. For comparison's sake, conventional formed bodies of the same shapes and sizes coated on the cordierite type honeycombed carrier with activated carbon granules were also subjected to the same adsorption test and the results are additionally shown in FIG. 6.

Figure 5:
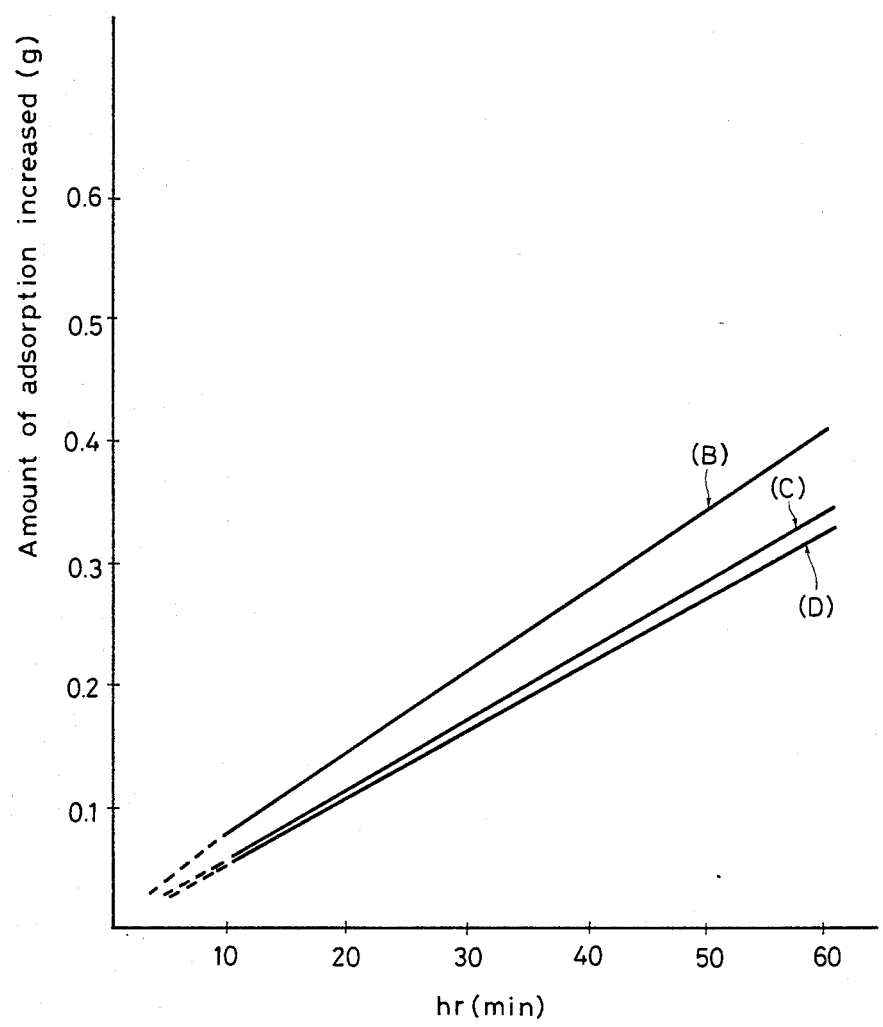
FIG. 5 is a graphic representation showing the adsorbing ability of the formed body of the invention.

FIG. 5 shows that the smaller the content of kibushi clay forming the inorganic substance carrier, the greater the increase in adsorption weight and the higher the superiority in adsorbing ability. However, it can be seen that there is not so much difference between a body (C) having 50 wt.% of kibushi clay and a body (D) having 70 wt.% and that even the body (D) of 70 wt.% of kibushi clay has a sufficient adsorbing ability.

Also, FIG. 6 shows that a body (B) having 30 wt.% of kibushi clay has an adsorbing ability four or five times as much as conventional honeycombed activated carbon bodies and that even a body (E) of 90 wt.% of kibushi clay considered lowest in adsorbing ability in the invention shows a better adsorbing ability than the conventional bodies. Thus, it is apparent from the above fact how high in activation the bodies of the invention are.

EXAMPLE 3

Thirty wt.% of 100-mesh pass kaolin powder and a suitable amount of organic binder and water were added to and kneaded with 70 wt.% of activated palm charcoal granules used in Example 1 to prepare a material composition (F). In another example 30 wt. % of kibushi clay used in Example 1 and a suitable amount of organic binder and water were added to and kneaded with 70 wt.% of 100-mesh pass activated palm charcoal granules commercially obtainable under the trade name of "Yashigara Y-150" produced by Hokuetsu Carbon Industrial Co., Ltd. to prepare a material composition (G). Thereafter, by use of the compositions (F) and (G), and in the same manner as in Example 2, two kinds of activated carbon honeycombed bodies having 450 cells per square inch and having a size of 25 mm in diameter×20 mm in length were obtained.

The bodies obtained (F) and (G) together with the body (B) of 30 wt.% of kibushi clay in Example 2 were subjected to an adsorption test under the same conditions as those in Example 2 to determine adsorption weight increased with the lapse of time. The results obtained are shown in FIG. 7.

Figure 7:
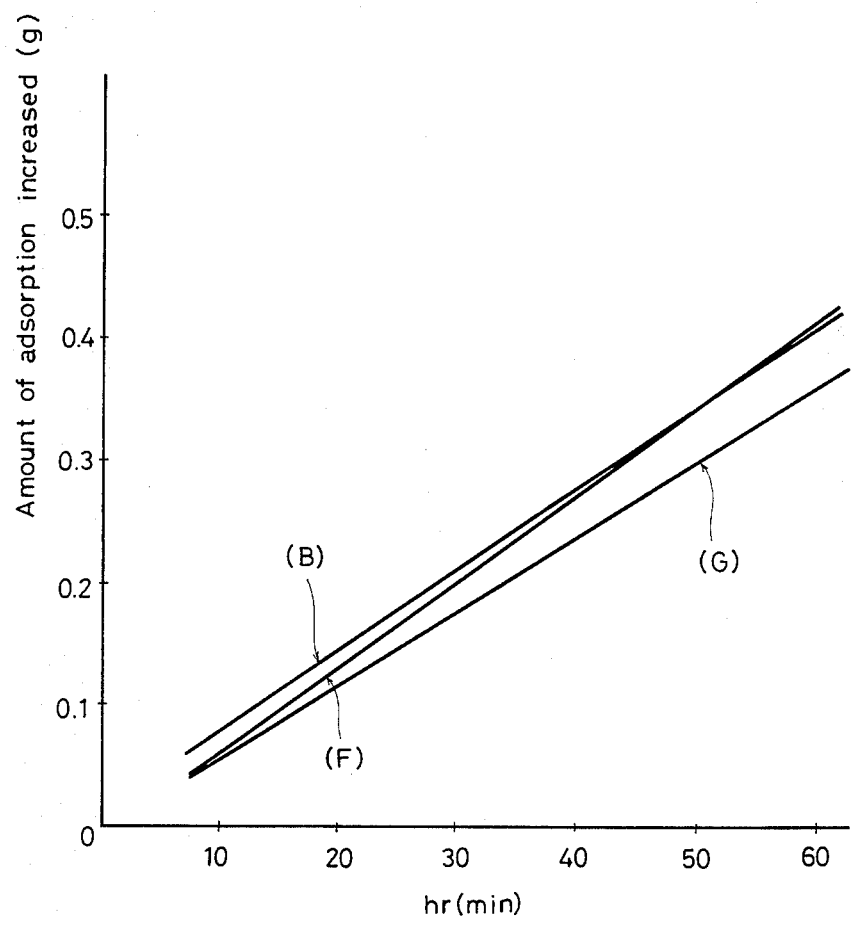

FIG. 7 shows that there is little or no difference in adsorbing ability between the bodies (B) and (F), and that in contrast thereto, the body (G) is slightly inferior in adsorbing ability. From this it is apparent that change of inorganic substances in kind has little or no effect on the adsorbing ability, but change of activated carbon granules in kind produces difference in the adsorbing ability of a body because of activation difference in the granules themselves.

EXAMPLE 4

Air containing 1 ppm of n-butyl meta acrylate was passed at a flow rate of 0.5 m/sec. through the honeycombed body (B) obtained in Example 2 (having 70 wt. % of activated carbon granules and 30 wt. % of kibushi clay), to examine the lifetime of the body (B) by determining the concentration C of n-butyl meta acrylate at the outlet of the body (B) in connection with the lapse of time. The results obtained are shown in FIG. 8.

For comparison's sake, the conventional honeycombed body (H) prepared by coating activated carbon granules on the surface of a cordierite carrier and a conventional filter (I) produced by laminating activated carbon fiber paper in a cardboard shape were also placed under the same conditions for examining the lifetime. The results obtained are additionally shown in FIG. 8.

Figure 8:
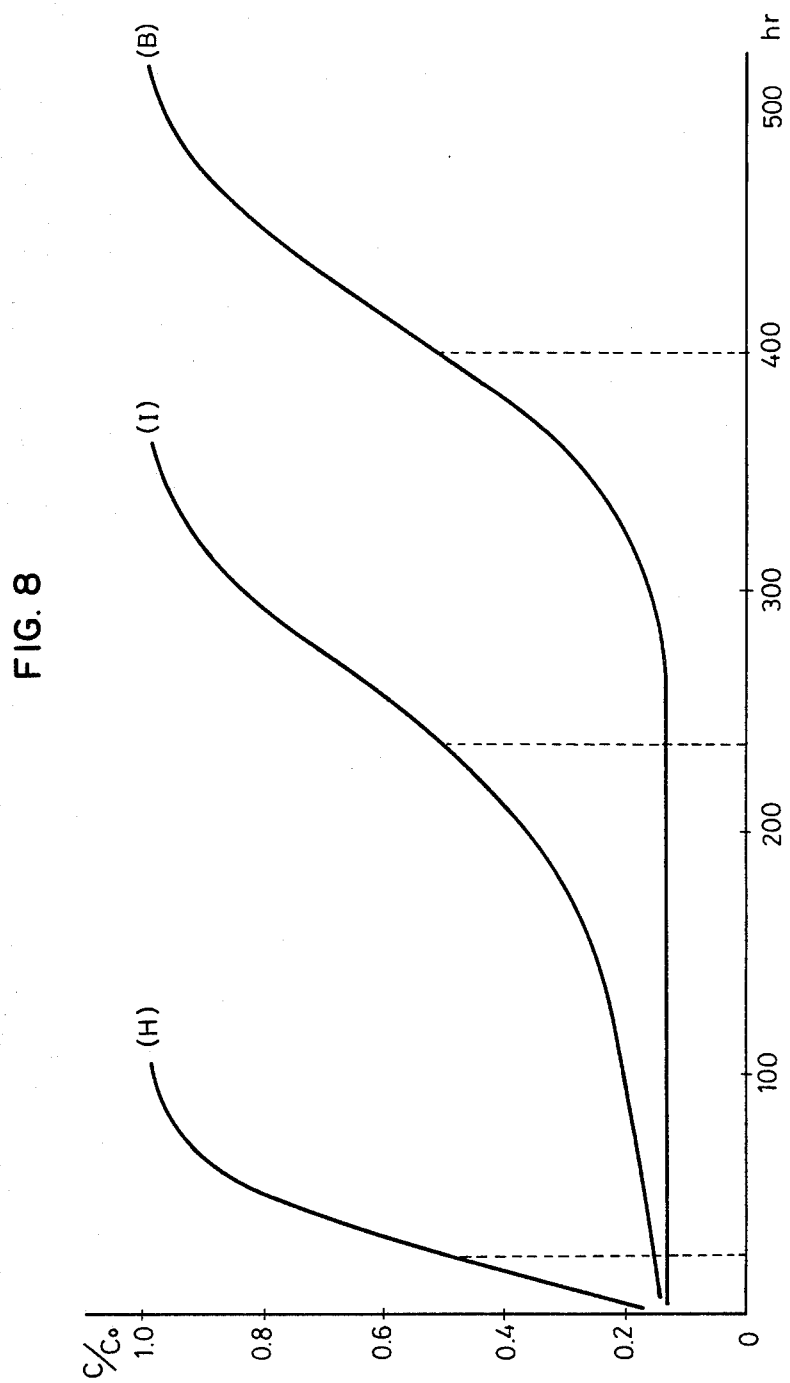
FIG. 8 is a graphic representation showing, by comparison, the service life of the formed body of the invention and that of conventional formed body.

FIG. 8 shows that the time during which adsorbing ability is reduced to a C/CO value of 0.5, namely, the time required for the reduction of n-butyl meta acrylate concentration C at the outlet of the activated carbon body to half of n-butyl meta acrylate concentration CO (1 ppm) at the outlet of the activated carbon body, takes about 400 hours in the case of the honeycombed body of the invention. However, it takes about 25 hours and about 240 hours, respectively, in the case of the conventional honeycombed body (H) and the conventional activated fiber paper laminated filter (I). This shows how long in lifetime the body (B) of the invention is.

As will be understood from the description so far given, since the activated carbon formed body of the invention is constructed so as to permit the activated carbon granules to be bondedly carried by an inorganic substance carrier, the body is larger in the amount of activated carbon granules than the conventional activated coating type bodies, with the result that a great increase in service life becomes possible. Further because the activated granule surface is exposed and porous contact between all the activated carbon granules on the surface and inside of the body and fluid becomes improved to provide excellent activation.

In addition, since the formed body of the invention has the activated carbon granules bonded to each other with an inorganic substance carrier consisting of an inorganic substance powder, the body is high in strength and provides little or no possibility of the formed body being reduced in strength by heat, and is superior in adsorbing ability. Furthermore, as for a method for producing the formed body, conventional ceramic production methods can be used without modification and can dispense with such activation treatment in the final step of production as used heretofore in the conventional formed bodies with the conspicuously advantageous result that a formed body can easily be produced in any desired shape and size.

Moreover, the production method according to the invention satisfies all of the requirements for activated carbon formed bodies in that the method makes it possible to prepare a material composition into a desired shape without any restriction to the formed bodies. This is achieved by use of the material composition which is excellent in handling and moldability, and produces an activated carbon formed body suitable for various uses on a mass production basis by employing a single step of firing the formed body in a nonoxidative atmosphere. The present method uses conventional ceramic production equipment for production of the formed bodies which are high in strength, free from deterioration, high in activation, and long in service life.

What is claimed is:

1. A method for producing a porous, fired, activated carbon formed body having a honeycombed structure about 60 to 70% of which is open space, comprising the steps of:
   (a) forming a mixture of from 70 to 30 wt. % of activated carbon granules, with from 30 to 70 wt. % of a clay carrier;
   (b) extruding said mixture into a body having a honeycombed shape about 60 to 70% of which is open space;
   (c) drying the thus-formed body; and
   (d) firing said dried body in a non-oxidizing atmosphere at a temperature of about 1100° C. for about 1 hour to about 4 hours thereby bonding the activated carbon granules with the clay carrier.

2. The porous, fired, activated carbon formed body according to claim 1 wherein said carbon granules have a size of 100 to 300 mesh.

3. The porous, fired, activated carbon formed body according to claim 1 wherein said honeycomb structure defines a plate-like body.

4. The porous, fired, activated carbon formed body according to claim 1 wherein said activated carbon granules are palm activated carbon granules.

5. The porous, fired, activated carbon body according to claim 1 wherein said activated carbon granules have a surface area of more than 800 $m^2/g$.

6. The porous, fired, activated carbon body according to claim 1 wherein said body defines about 300 to 600 cells per square inch.

7. The method according to claim 1 wherein said non-oxidizing atmosphere is selected from the group consisting of $H_2$, $CO_2$, a mixture of $N_2$ and $H_2$, and a mixture of $CO_2$ and $H_2$.

8. A porous, fired, activated carbon formed body manufactured by the method according to claim 1.

* * * * *